United States Patent [19]

Sasaki et al.

[11] Patent Number: 5,046,583
[45] Date of Patent: Sep. 10, 1991

[54] OIL LEVEL SENSOR FOR AN INTERNAL COMBUSTION ENGINE

[75] Inventors: Asao Sasaki, Noda; Yosuke Kubota, Kita, both of Japan

[73] Assignee: Fuji Jukogyo Kabushiki Kaisha, Tokyo, Japan

[21] Appl. No.: 528,036

[22] Filed: May 23, 1990

[30] Foreign Application Priority Data

May 25, 1989 [JP] Japan .................................. 1-132089

[51] Int. Cl.$^5$ ............................................. F01M 1/18
[52] U.S. Cl. ..................................... 184/6.4; 184/108; 340/450.3
[58] Field of Search ................. 184/6.4, 108; 340/631, 340/450.3, 450, 622; 123/196 S

[56] References Cited

U.S. PATENT DOCUMENTS

| 3,593,270 | 7/1971 | Walker | 340/450 |
| 3,701,138 | 10/1972 | Pulliam et al. | 340/622 |
| 4,135,186 | 1/1979 | Minorikawa et al. | 340/622 |
| 4,638,288 | 1/1987 | Remec | 340/622 |
| 4,745,893 | 5/1988 | Atherton et al. | 184/6.4 |
| 4,755,790 | 7/1988 | Umehara | 340/450.3 |

FOREIGN PATENT DOCUMENTS 62-26379 2/1987 Japan .
62-93417 4/1987 Japan .

Primary Examiner—Ira S. Lazarus
Assistant Examiner—Alan B. Cariaso
Attorney, Agent, or Firm—Martin A. Farber

[57] ABSTRACT

An oil level sensor has a cylindrical hollow sensor body and an elongated inner electrode provided in the sensor body at a distance from the inner wall of the sensor body. The sensor body and the inner electrode are made of conductive resin including carbon particles. An oil level detector circuit is provided in the sensor body.

7 Claims, 3 Drawing Sheets

OIL LEVEL SENSOR FOR AN INTERNAL COMBUSTION ENGINE

BACKGROUND OF THE INVENTION

The present invention relates to an oil level sensor for detecting the level of lubricating oil in an internal combustion engine.

In an industrial engine, if the engine is operated without noticing a shortage of the lubricating oil, the engine becomes damaged due to burning.

Consequently, an oil level sensor is provided for monitoring the level of the lubricating oil at all times. When the oil sensor detects a lower level for the oil lower than a set level, the engine is stopped or an alarm lamp is turned on to prevent the engine from being damaged.

Japanese Patent Applications Laid-Open 62-93417 and 62-26379 disclose oil sensors employed with an oil pressure switch and a reed switch, respectively.

The oil sensor employed with the reed switch consists of various components such as a float and a magnet in addition to the reed switch, so that the oil sensor is complicated in construction. Further, the sensor must be assembled in a crankcase before assembling the engine.

The oil sensor employed with the oil pressure switch can not be used for an engine without an oil pump.

To the contrary, a fluid sensor detects the amount of fluid by measuring a resistance of the fluid.

The fluid sensor comprises a center electrode and an outer electrode surrounding the center electrode at a predetermined distance. The fluid sensor detects the volume and concentration of the fluid, and other conditions in accordance with the variation of the resistance between the center electrode and the outer electrode.

The variation of the resistance is detected by measuring a current flowing in the fluid sensor. However, the current representing the variation of the resistance of oil is very small, because the resistance is large. Thus, a shielded wire must be employed for a signal line in order to prevent the influence of noises. However, it is difficult to completely eliminate the influence of noise.

Further, the shielded wire must be connected to a control unit by a connector, which causes an increase of parts and the assembling process.

Moreover, a high-insulating resistor must be provided in the control unit. However, the high-insulating resistor electrically affects other circuits.

SUMMARY OF THE INVENTION

The object of the present invention is to provide an oil level sensor which detects the level of oil in an oil pan with accuracy without influence of noise.

Another object of the present invention is to provide an oil level sensor in which the number of the parts of the sensor is reduced, thereby reducing the manufacturing cost and the assembling process.

According to the present invention, there is provided an oil level sensor comprising a cylindrical hollow sensor body made of conductive resin, an inner electrode guide made of an insulator and secured to an inner wall of the sensor body, an elongated inner electrode made of conductive resin and securely mounted in the inner electrode guide so as to keep a predetermined distance from the inner wall of the sensor body, and an oil level detector circuit provided in the sensor body and electrically connected between the inner electrode and the sensor body.

In an aspect of the invention, the inner electrode has a flange at a base portion thereof and a connecting portion projected from the flange, and a circuit board is secured to the connecting portion. An oil level detector circuit has a comparator for producing an output signal having a logical level and a thermistor for compensating the resistance variation of oil caused by heat.

The other objects and features of this invention will become understood from the following description with reference to the accompanying drawings.

DETAILED DESCRIPTION OF THE PREFERRED EMBODIMENTS

Figure 1:
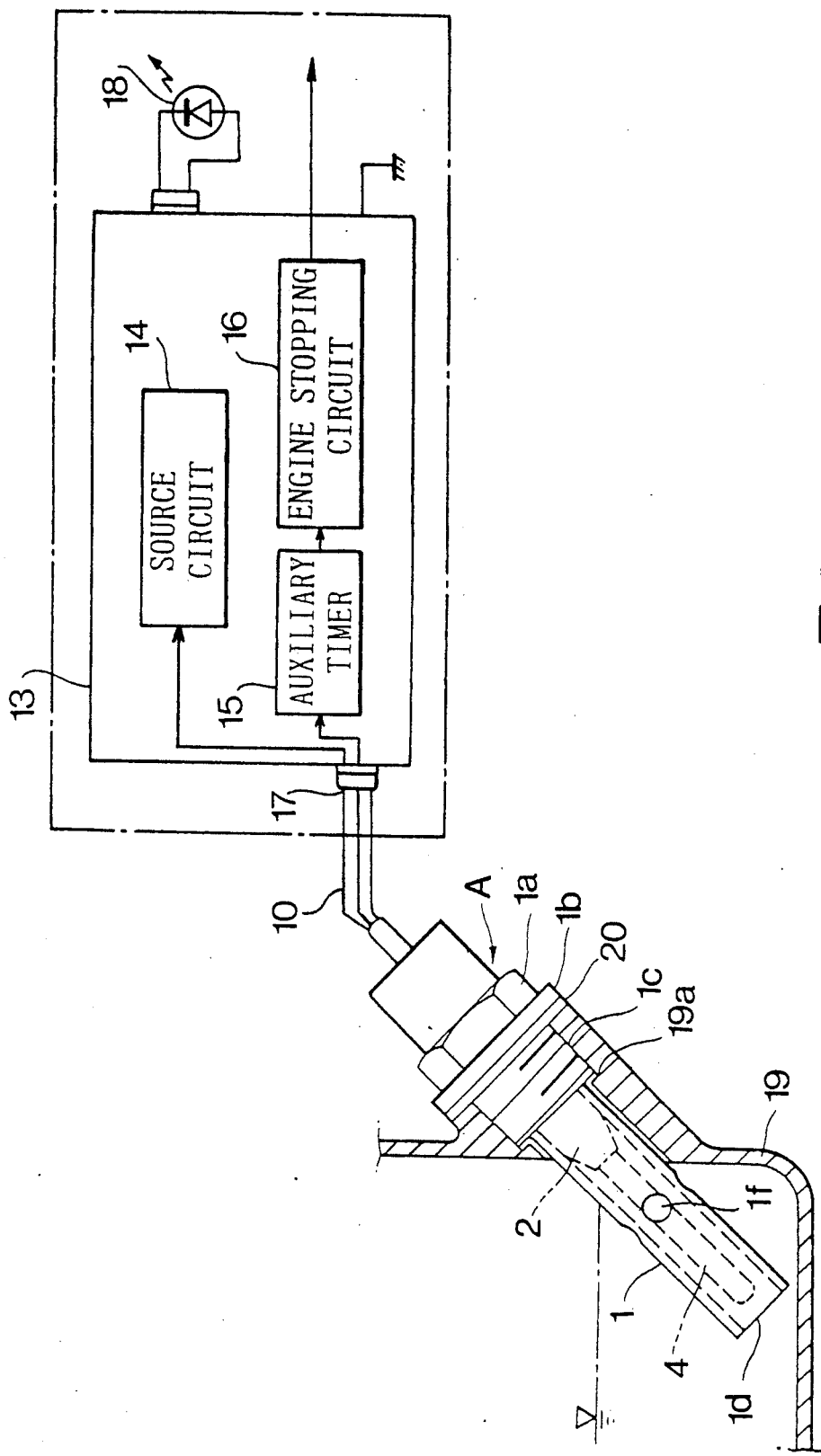
FIG. 1 is a schematic illustration of an oil level sensor according to the present invention, a part of which is shown in section.

Referring to FIG. 1, an oil level sensor A is provided in an oil pan 19 of an engine (not shown) by engaging a threaded opening 19a formed in the oil pan through a packing 20.

Figure 2:
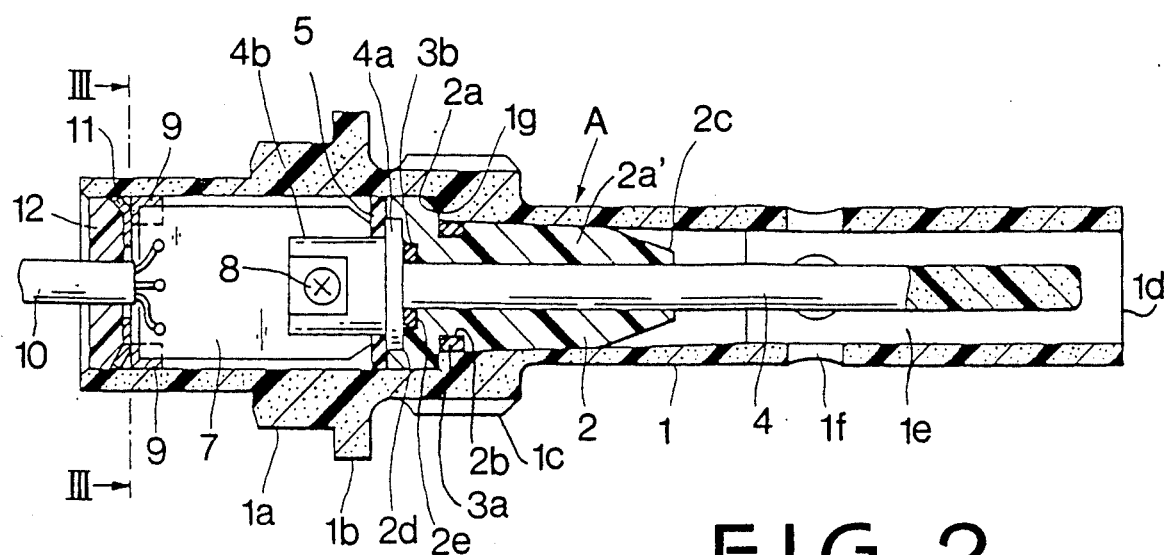
FIG. 2 is a sectional view showing the oil level sensor.
Figure 3:
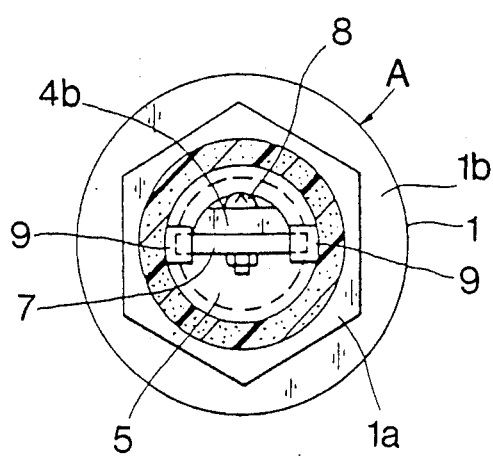
FIG. 3 is a sectional view of the oil level sensor taken along the line III—III of FIG. 2.

Referring to FIGS. 2 and 3, the oil sensor A has a cylindrical sensor body 1 served as an outer electrode, which is made of electrically conductive resin including carbon particles molded by injection molding.

The sensor body 1 comprises a screw head 1a, a flange 1b adjacent to the screw head 1a, and an outer thread 1c adjacent to the flange 1b. The sensor body 1 has a cylindrical hollow portion 1e and air vents 1f formed in the body, communicating with the hollow portion 1e. A stepwise portion 1g is formed on an inside wall of the sensor body 1.

In the hollow portion 1e, an inner electrode guide 2 is securely mounted. The guide 2 is made of high-resistance insulation resin with heat proof. The guide 2 has a shoulder portion 2a engaged with the stepwise portion 1g of the sensor body 1, a cylindrical body portion 2a' and a taper portion 2c formed on an end of the cylindrical portion 2a'. The guide 2 has an axial hole formed along the axis, opening at both ends. An annular groove 2b is formed on the cylindrical body portion 2a' for engaging an O-ring 3a.

The entire outer surface of the guide 2 or at least an outer surface of the taper portion 2c is coated with such material as fluororesin having heat proof, electrical resistivity and oil repelling characteristics for preventing the oil from adhering to the guide 2.

The guide 2 has a recess 2d formed on the shoulder portion 2a at a predetermined depth in the axial direction of the guide and a groove 2e formed on the bottom of the recess 2d for engaging an O-ring 3b.

An inner electrode 4 is made of conductive resin including carbon particles and formed by injection molding. The inner electrode 4 is engaged in the axial hole of the guide 2 at an end portion thereof. The inner electrode 4 has a flange 4a provided on the axially inner, upper end thereof to be engaged with the bottom of the recess 2d and a connecting portion 4b projecting from the flange 4a in the hollow portion 1e. The end portion of the flange 4a is sealed by the O-ring 3b. The connecting portion 4b has a semicircular cross section. An insulator washer 5 is mounted on the connecting portion 4a and abutted on the flange 4a. A rectangular printed board 7 is mounted in the hollow portion 1e and abutted on the washer 5 at an end thereof. The printed circuit board 7 has an oil level detector circuit 6 mounted thereon and is secured to a flat surface of the projecting connecting portion 4b by a screw 8.

A pair of conductive metallic clamps 9 are mounted on the opposite corners of the printed board 7 and engaged with the inside wall of the sensor body 1. Wires 10 for a source line and a signal line are connected to the printed board 7. An annular conductive washer 11 having a bent flange is attached to the clamps 9. The bent flange of the washer 11 engages with the inside wall of the sensor body 1. Thus, the ground of the printed board 7 is electrically connected to the sensor body 1 through the clamps 9 and washer 11.

An insulation cap 12 is engaged in the sensor body 1. The space between the washers 5 and 11 surrounding the printed board 7 is filled with epoxiresin.

Figure 4:
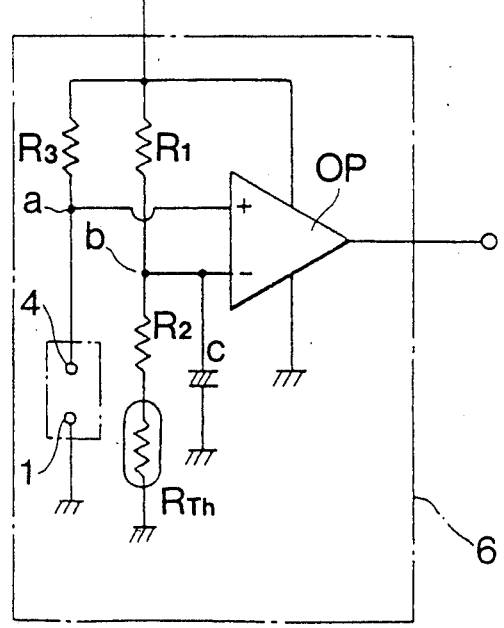
FIG. 4 is a circuit of an oil level detector.

FIG. 4 shows the oil level detector circuit 6 mounted on the printed board 7. The circuit 6 has a comparator OP and a voltage divider comprising resistors R1, R2 and a thermistor RTh connected in series between a source V (for example, +5V) in a source circuit 14 of an engine control unit 13 and the ground. The inner electrode 4 of the oil sensor A is connected to the source V through a resistor R3. An inverting terminal of the comparator OP is connected between the resistors R1 and R2 and a non-inverting terminal is connected between the electrode 4 and the resistor R3.

If the resistance between the sensor body 1 and the inner electrode 4 is RDUT, potential Va at a point a is represented as $$Va = \frac{RDUT}{RDUT + R3} \times V$$

and potential Vb at a point b is $$Vb = \frac{R2 + RTh}{R2 + RTh + R1} \times V.$$

Resistances 5 of the resistors R1, R2 and R3 and the thermistor RTh are determined such that the potentials satisfy Va<Vb when oil exists between the sensor body 1 and the inner electrode 4.

Figure 5:
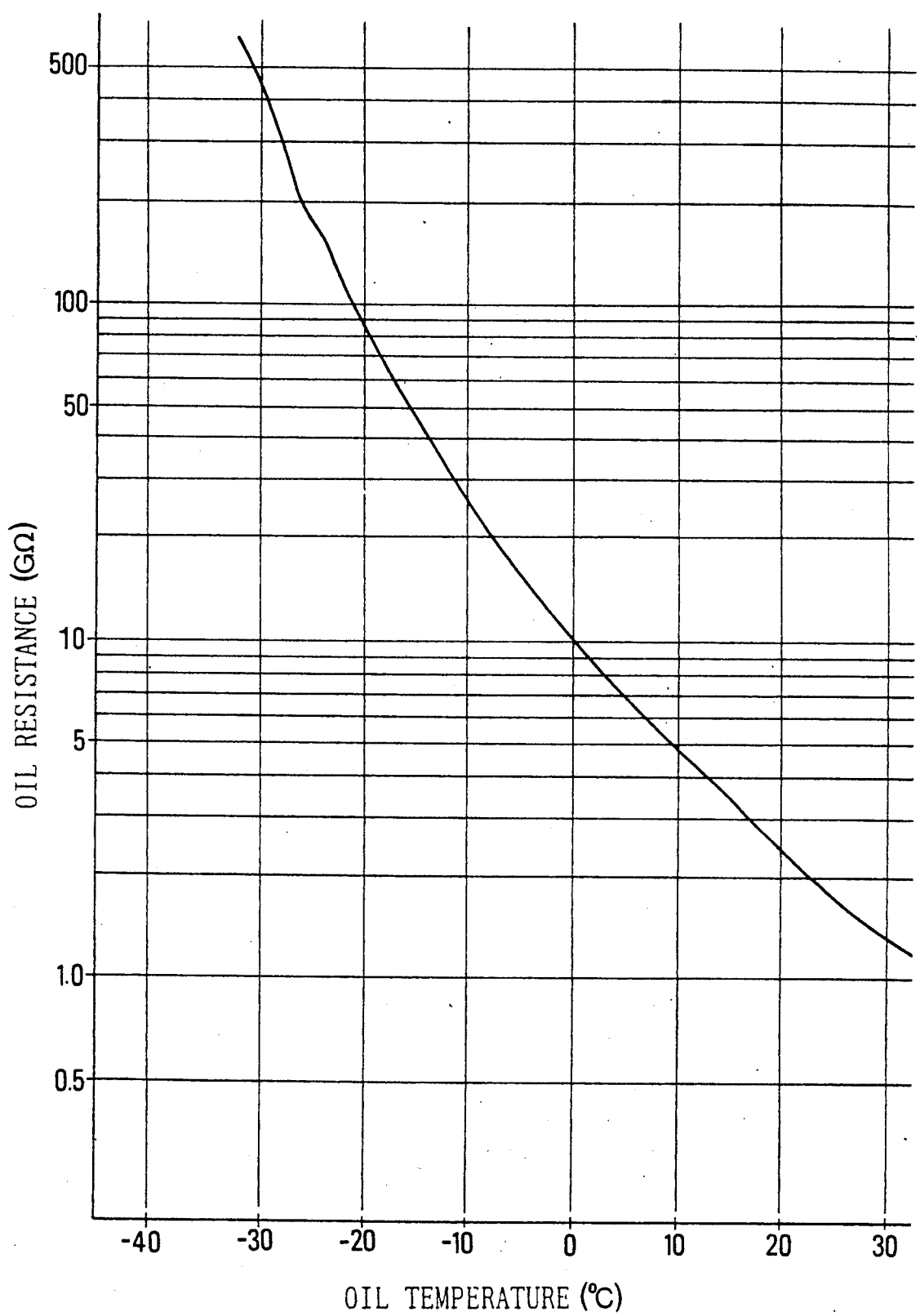
FIG. 5 is a graph showing characteristic of insulation resistance and temperature of oil.

As shown in FIG. 5, the resistance of oil reduces with an increase of temperature of the oil. The thermistor RTh is arranged to have a negative characteristic RTh which coincides with the variation of the resistance, so that the relation of the voltages Va and Vb may be Va<Vb.

When the oil resistance between the electrodes is detected, the comparator OP produces a low level signal from an output terminal thereof.

If the level of the oil in the oil pan 19 lowers to expose the sensor body 1 from the oil, the resistance RDOU between the sensor body 1 and the inner electrode 4 becomes large. Consequently, the potential Va becomes higher than Vb (Va>Vb). Thus, the comparator OP produces a high level signal.

The output terminal of the comparator OP is connected to the engine control unit 13 through wires 10 and a connector 17 as shown in FIG. 1. The engine control unit 13 is provided with the source circuit 14, an auxiliary timer 15 and an engine stopping circuit 16.

The auxiliary timer 15 is provided for preventing an erroneous detection caused by the movement of the surface of oil. When the high level signal is applied from the detector circuit 6 to the unit 13, the auxiliary timer 15 operates to measure a generating time of the high level signal. If the generating time exceeds a predetermined time, the timer 15 produces a trigger signal which is applied to the engine stopping circuit 16.

The engine stopping circuit 16 operates to ground a primary winding of an ignition coil (not shown) of a gasoline engine or to position a control rack of a fuel injection pump of a diesel engine to a close position. Thus, the engine stops and an alarm lamp 18 of a light emitting diode is turned on.

As shown in FIG. 1, the oil sensor A is inserted into the threaded opening 19a of the oil pan 19 and the outer thread 1c of the sensor body 1 is screwed in the threaded opening 19a, interposing the packing 20. Thus, the oil level sensor A is attached to the oil pan 19.

Describing the operation, when a key switch (not shown) of the engine is turned on to start the engine, a battery voltage is applied to the control unit 13 and the constant voltage V is applied to the oil level detector circuit 6 in the oil level sensor A.

During the operation of the engine, if the oil pan 11 is sufficiently filled with the oil, both the lower portions of the sensor body 1 and the inner electrode 4 are soaked in the oil of the oil pan 19. The sensor detects the resistance of oil between the sensor body 1 and the inner electrode 4. As hereinbefore described, potentials Va and Vb between the points a and b are Va<Vb. The comparator OP produces a low level signal.

If the level of the oil in the oil pan 19 lowers to expose the sensor body 1 from the oil, the resistance between the sensor body 1 and the inner electrode becomes large. The potential Va applied to the non-inverting terminal of the comparator OP becomes higher than the potential Vb applied to the inverting terminal. The comparator OP produces accordingly a high level signal.

In accordance with the present invention, the oil level detector circuit 6 is mounted in the oil level sensor A, and hence the low and high level signals are directly applied to the engine control unit without a shielded wire. Accordingly, the oil level detecting system becomes simple in construction, thereby reducing the manufacturing cost of the system.

Since the oil level sensor A produces a signal having a high or low level in accordance with the oil level, the process in the control unit 13 becomes simple and a system for preventing noise is simplified. The oil level sensor can be easily used for various types of the control circuits.

Since the sensor body 1 is made of conductive resin including carbon, the resistance of the sensor body is very small compared with the oil resistance. Accordingly, the resistance of the sensor body has a value within a detecting error of the sensor.

Since the sensor body 1 and the inner electrode 4 are made of resin having a low heat conductivity, the heat of the oil and the heat of the crankcase of the engine are hardly transmitted to the oil level detector circuit 6 in the oil level sensor A. Thus, the deterioration of the detector 6 caused by heat is eliminated.

If the vertical position of the oil sensor A is set at a higher position, the shortage of oil is indicated without stopping the engine.

The level of the oil in the oil pan is accurately detected without the influence of noise. The number of parts of the oil level sensor are reduced, thereby reducing manufacturing cost. Thus, an oil level sensor having a high reliability and operability is provided.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An oil level sensor for sensing a level of oil in an oil pan, comprising:
    a cylindrical sensor body having a cylindrical hollow portion, said cylindrical sensor body being made of electrically conductive resin having low heat conductivity including carbon;
    an elongated inner electrode made of electrically conductive resin having low heat conductivity;
    an inner electrode guide made of an insulator and supporting said elongated inner electrode so as to provide a predetermined space between an inner surface of said cylindrical sensor body and said inner electrode; and
    an oil level detecting circuit electrically connected to the inner electrode and the sensor body for detecting resistance between said sensor body and said inner electrode and for producing a logical level signal when said predetermined space is filled with the oil.

2. The oil level sensor according to claim 1, wherein said inner electrode has a flange and a connecting portion projecting from said flange, and a circuit board is secured to the connecting portion, said oil level detecting circuit is provided on said circuit board.

3. The oil level sensor according to claim 1, wherein said oil level detecting circuit comprises
    a predetermined resistance, and
    comparing means for comparing said predetermined resistance with said first-mentioned resistance between said sensor body and said inner electrode, and for producing an output signal having a logical level so as to detect the level of the oil with accuracy without influence of noise.

4. The oil level sensor according to claim 1, wherein said oil level detecting circuit has a thermistor for compensating resistance variation of the oil caused by variation in temperature of the oil.

5. The oil level sensor according to claim 1, wherein said carbon is in the form of carbon particles.

6. The oil level sensor according to claim 1, wherein said inner electrode is further made of carbon.

7. The oil level sensor according to claim 6, wherein said carbon of said inner electrode is in the form of carbon particles.

* * * * *